United States Patent
Je et al.

(10) Patent No.: US 10,826,058 B2
(45) Date of Patent: Nov. 3, 2020

(54) POSITIVE ELECTRODE FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Hyun-Joo Je, Yongin-si (KR); Jeong-Hoon Kim, Yongin-si (KR); Ji-Hyun Kim, Yongin-si (KR); Soo-Youn Park, Yongin-si (KR); Chang-Wook Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 237 days.

(21) Appl. No.: 15/608,812

(22) Filed: May 30, 2017

(65) Prior Publication Data

US 2017/0346133 A1 Nov. 30, 2017

(30) Foreign Application Priority Data

May 30, 2016 (KR) .......................... 10-2016-0066628

(51) Int. Cl.
*H01M 10/0525* (2010.01)
*H01M 4/36* (2006.01)
*H01M 4/13* (2010.01)
*H01M 10/0587* (2010.01)
*H01M 4/02* (2006.01)
*H01M 10/052* (2010.01)

(52) U.S. Cl.
CPC ............. *H01M 4/366* (2013.01); *H01M 4/13* (2013.01); *H01M 10/052* (2013.01); *H01M 10/0587* (2013.01); *H01M 2004/021* (2013.01)

(58) Field of Classification Search
CPC ......... H01M 10/052; H01M 2004/021; H01M 10/0587; H01M 4/366; H01M 4/13
USPC .......................................................... 429/209
See application file for complete search history.

(56) References Cited

U.S. PATENT DOCUMENTS

2008/0206650 A1* 8/2008 Kim ...................... H01M 4/131
429/326
2008/0311481 A1* 12/2008 Kim ........................ H01M 4/13
429/342

(Continued)

FOREIGN PATENT DOCUMENTS

| KR | 10-2013-0125236 | 11/2013 |
|---|---|---|
| KR | 10-2014-0083199 | 7/2014 |
| KR | 10-2014-0098424 | 8/2014 |

*Primary Examiner* — Jonathan G Jelsma
*Assistant Examiner* — Omar M Kekia
(74) *Attorney, Agent, or Firm* — Lewis Roca Rothgerber Christie LLP

(57) ABSTRACT

The present invention relates to a positive electrode for a rechargeable lithium battery and a rechargeable lithium battery including the same. The positive electrode includes: a current collector; and a positive electrode active material positioned on at least one surface of the active material layer current collector. The positive electrode active material layer includes a small particle size active material having an average particle diameter D50 of 2 μm to 4 μm and a first coating layer positioned at a surface thereof, and a large particle size active material having an average particle diameter D50 of 17 μm to 21 μm and a second coating layer positioned at the surface thereof.

10 Claims, 17 Drawing Sheets

(56) References Cited

U.S. PATENT DOCUMENTS

2009/0136854 A1\* 5/2009 Nakura ................ H01M 4/131
                                              429/342
2011/0033749 A1\* 2/2011 Uchida ............... H01M 4/1315
                                              429/223
2013/0302685 A1 11/2013 Kim et al.

\* cited by examiner

POSITIVE ELECTRODE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2016-0066628, filed on May 30, 2016 in the Korean Intellectual Property Office (KIPO), the entire content of which is incorporated herein by reference.

BACKGROUND

1. Field

The following description relates to a positive electrode for a rechargeable lithium battery and a rechargeable lithium battery including the same.

2. Description of the Related Art

A rechargeable lithium battery not only has high operation voltage and high energy density, but can also be utilized longer, and accordingly, the rechargeable lithium battery satisfies the complex requirements associated with the diversity and complexity of devices.

In particular, recently, studies for extending (e.g., broadening) the field of application of rechargeable lithium batteries have been diversely performed, and accordingly, efforts have been made to obtain a rechargeable lithium battery having an excellent cycle-life characteristic while having high energy density.

The above information disclosed in this Background section is only for enhancement of understanding of the background of the invention and therefore it may contain information that does not form the prior art that is already known to a person of ordinary skill in the art.

SUMMARY

An aspect according to one or more embodiments of the present disclosure is directed toward a positive electrode for a rechargeable lithium battery having an active mass density.

Also, another aspect according to one or more embodiments of the present disclosure is directed toward a rechargeable lithium battery including the positive electrode active material.

According to one embodiment of the present disclosure, a positive electrode for a rechargeable lithium battery includes: a current collector; and a positive electrode active material layer on at least one surface of the current collector, wherein the positive electrode active material layer includes a small particle size active material having an average particle diameter D50 of 2 μm to 4 μm and a first coating layer at a surface thereof, and a large particle size active material having an average particle diameter D50 of 17 μm to 21 μm and a second coating layer at the surface thereof.

Also, according to another embodiment of the present disclosure, a rechargeable lithium battery includes the positive electrode, a negative electrode, and an electrolyte.

The positive electrode for the rechargeable lithium battery according to an exemplary embodiment of the present invention remarkably decreases plate fractures and particle cracks in the rolling process, thereby obtaining high active mass density.

Accordingly, the rechargeable lithium battery according to one or more embodiments of the present invention applying (utilizing) the positive electrode may have remarkably improved low temperature and high temperature cycle-life characteristics.

DETAILED DESCRIPTION

Figure 1:
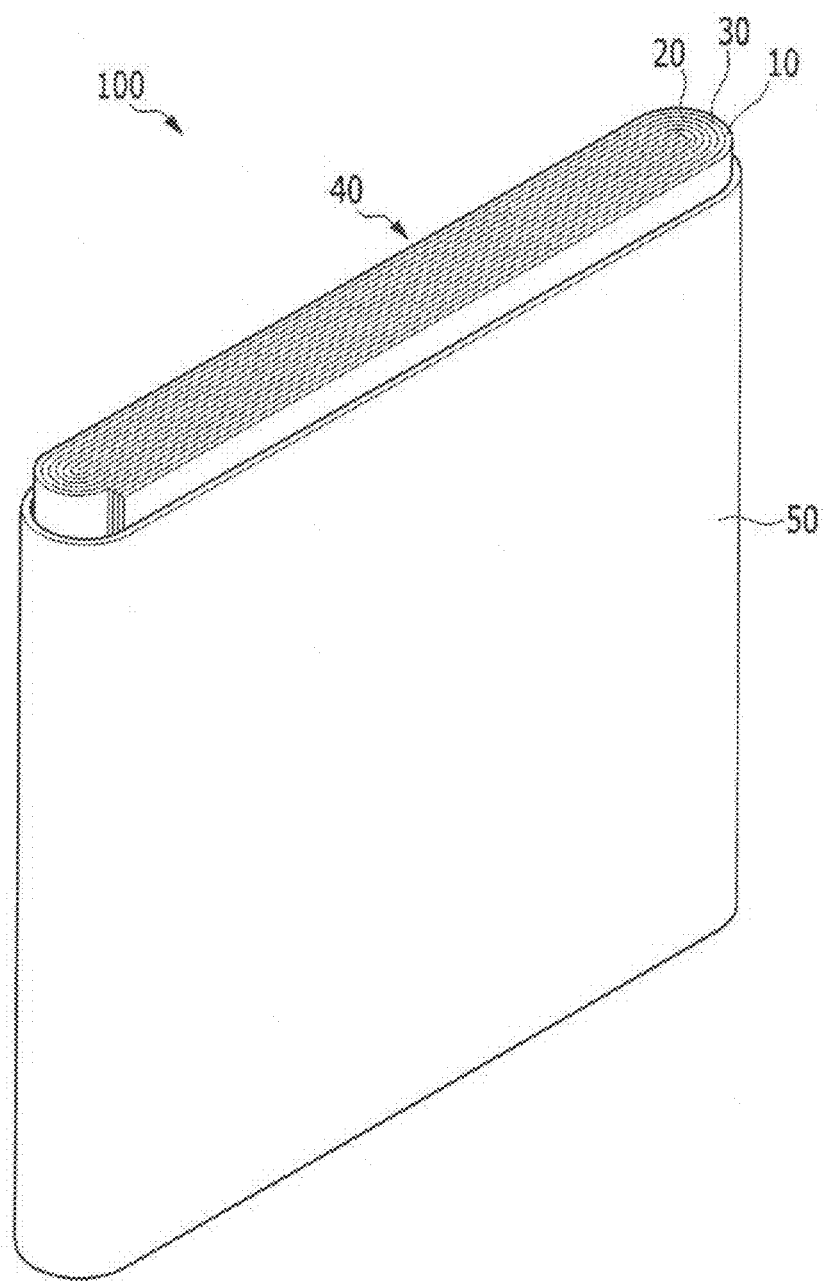
FIG. 1 is a view schematically showing a structure of a rechargeable lithium battery according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In addition, unless explicitly described to the contrary, the term "comprise" and variations thereof, such as "comprises"

or "comprising", will be understood to imply the inclusion of the stated elements, but not the exclusion of any other elements.

In a rechargeable lithium battery, a positive electrode active material has a very important role with respect to the battery performance and the stability of the rechargeable lithium battery. Generally, a positive electrode active material slurry composition is manufactured and is coated on a thin metal plate (a current collector, such as aluminum) to be utilized as a positive electrode of the rechargeable lithium battery.

Particularly, as a part of a method to increase the energy density of the battery, it is common to conduct a rolling process for manufacturing a plate (positive electrode plate or the positive electrode) having high active mass density when manufacturing a positive electrode plate.

However, while the active mass density may be increased, the active material particle may be broken when performing the rolling process such that the performance of the battery may be deteriorated.

Accordingly, as a result of extensive studies by the inventors of the present invention to manufacture a positive electrode having high active mass density, it was discovered that if a mixture having a bi-modal size distribution and containing a large particle size active material and a small particle size active material, each formed with a coating layer on the surface thereof, is utilized as the positive electrode active material, the high active mass density without the plate fracture may be realized and simultaneously low temperature and high temperature cycle-life characteristics may be improved, and an exemplary embodiment of the present invention was completed.

In more detail, the positive electrode for the rechargeable lithium battery according to an exemplary embodiment of the present invention includes a current collector and a positive electrode active material positioned on at least one surface of the current collector. The positive electrode active material includes a small particle size active material (an active material with a small particle size) having an average particle diameter D50 in a range of 2 μm to 4 μm and a first coating layer positioned on the surface thereof and a large particle size active material (an active material with a large particle size) having an average particle diameter D50 of 17 μm to 21 μm and a second coating layer positioned on the surface thereof.

In this case, as the current collector, for example, an aluminum foil, a nickel foil, a stainless steel foil, a titanium foil, a nickel foam, a copper foam, a polymer material coated with a conductive metal, or a combination thereof may be utilized, but embodiments of the present disclosure are not limited thereto.

Also, the positive electrode active material may be a material (e.g., a mixture) in which the small particle size active material having the average particle diameter D50 of 2 μm to 4 μm and the large particle size active material having the average particle diameter D50 of 17 μm to 21 μm are mixed.

First, the small particle size active material will be described. In one embodiment, the small particle size positive electrode active material has the average particle diameter D50 of 2 μm to 4 μm. When the average particle diameter D50 of the small particle size active material satisfies the above range, in the rolling process of the positive electrode manufacturing process, the pressure applied to the current collector may be reduced. Accordingly, when performing the spiral-wound process (after manufacturing the positive electrode by utilizing the mixed positive electrode active material including the small particle size active material having the above-described average particle diameter) and when manufacturing the electrode by applying the positive electrode, even if pressure is applied, it is possible to secure the desired battery capacity while the electrode is not broken.

In the present specification, the average particle diameter D50 refers to the diameter at a cumulative 50% point in a grain-size (e.g., particle size) distribution.

Next, in an embodiment, the large particle size active material has an average particle diameter D50 of 17 μm to 21 μm. When the average particle diameter D50 of the large particle size active material satisfies the above range, the positive electrode having appropriate capacity, cycle-life characteristics, and high active mass density may be manufactured. That is, when the average particle diameter D50 of the large particle size active material is 17 μm or more, the positive electrode having the high active mass density may be manufactured, and when the average particle diameter D50 of the large particle size active material is 21 μm or less, the positive electrode having excellent rate and cycle-life characteristics may be obtained.

In one embodiment, the first coating layer and the second coating layer are respectively formed on the surfaces of the small particle size active material and the large particle size active material.

In this case, the first coating layer and the second coating layer may be formed of the same material, or may be formed of different materials, and embodiments of the present disclosure are not limited thereto.

In more detail, at least one of the first coating layer and the second coating layer may include at least one element selected from Al, Ti, Mg, Co, K, Na, Ca, Si, V, Sn, Ge, Ga, B, As, and Zr.

Further, the first coating layer and the second coating layer may include at least one coating element compound selected from an oxide of the coating element, a hydroxide of the coating element, an oxyhydroxide of the coating element, an oxycarbonate of the coating element, and a hydrocarbonate of the coating element. The compound forming these coating layers may be amorphous or crystalline, and the compound is not particularly limited. Here, the formation process of the first coating layer and the second coating layer may utilize any suitable method without restriction if the physical properties of the positive electrode active materials are not adversely affected by utilizing these elements in the small particle size active material and the large particle size active material. In more detail, for example, the first coating layer and the second coating layer may be formed by spray coating, dipping, etc., but embodiments of the present disclosure are not limited thereto.

In one embodiment, at least one of the first coating layer and the second coating layer includes Al and Ti. In more detail, for example, Al hydroxide and Ti oxide may be included. When Al is included in at least one of the first coating layer and the second coating layer, a high temperature cycle-life characteristic of the battery may be improved, and when Ti is included in at least one of the first coating layer and the second coating layer, the rate characteristic and the high temperature cycle-life characteristic may be improved.

In this case, for the content of Al and Ti, based on the respective at least one of the first coating layer and the second coating layer, the Al mol % may be 0.01 to 1 (e.g., Al may be included at 0.01 to 1 mol %), and the Ti mol % may be 0.01 to 1 (e.g., Ti may be included at 0.01 to 1 mol %).

That is, when the Al mol % and the Ti mol % are 0.01 or more, the above-described effects (e.g., the rate characteristic and/or the high temperature cycle-life characteristic) may all be realized, and in the case of (when the Al mol % and the Ti mol % are) 1 or less, the capacity increase and the characteristic improvement may be realized.

On the other hand, in the present description, the small particle size active material and the large particle size active material may be (e.g., each independently) one selected from a lithium-nickel-containing oxide, a lithium-cobalt-containing oxide, a lithium-iron-phosphate-containing oxide, a lithium-manganese-containing oxide, a lithium-titanium-containing oxide, a lithium-nickel-manganese-containing oxide, a lithium-nickel-cobalt-manganese-containing oxide, a lithium-nickel-cobalt-aluminum-containing oxide, or combinations thereof, but embodiments of the present disclosure are not limited thereto. In this case, the small particle size active material and the large particle size active material may be the same material, or may be formed by mixing different materials. However, embodiments of the present disclosure are not particularly limited thereto.

In more detail, the small particle size active material and the large particle size active material, for example, may be one or more composite oxides of the metal selected from cobalt, manganese, nickel, and combinations thereof, and lithium (e.g., a composite oxide including lithium and one or more metals selected from cobalt, manganese, nickel, and combinations thereof). In more detail, a compound represented by a chemical formula below may be utilized. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0 \leq b \leq 0.5$, $0 \leq c \leq 0.05$); $Li_aE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_2X_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$).

In the chemical formulae above, A is selected from Ni, Co, Mn, and combinations thereof; X is selected from Al, Ni, Co, Mn, Cr, Fe, Mg, Sr, V, rare earth elements, and combinations thereof; D is selected from O, F, S, P, and combinations thereof; E is selected from Co, Mn, and combinations thereof; T is selected from F, S, P, and combinations thereof; G is selected from Al, Cr, Mn, Fe, Mg, La, Ce, Sr, V, and combinations thereof; Q is selected from Ti, Mo, Mn, and combinations thereof; Z is selected from Cr, V, Fe, Sc, Y, and combinations thereof; and J is selected from V, Cr, Mn, Co, Ni, Cu, and combinations thereof.

Also, a content ratio (e.g., a weight ratio) of the large particle size active material to the small particle size active material may be in a range of 75:25 to 95:5, for example, 80:20 to 90:10. When the content ratio of the large particle size active material to small particle size active material satisfies these ranges, the mixed positive electrode active material has the bi-modal size distribution such that the high active mass density may be achieved.

Also, the positive electrode active material layer including the large particle size active material and the small particle size active material may further include a binder and a conductive material.

In this case, the content of the binder and the content of the conductive material may be each independently in the range of 1 to 5 wt % for the entire weight of the positive electrode active material layer.

The binder serves to adhere the positive electrode active material particles to each other well and to adhere the positive electrode active material to the current collector well, and a representative example may be polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acryl federated (e.g., copolymerized) styrene-butadiene rubber, epoxy resin, and/or nylon, but embodiments of the present disclosure are not limited thereto.

The conductive material is utilized to provide the conductivity to the electrode, and in the configured battery, any suitable material may be utilized as an electron conductive material as long as it does not cause a chemical change. Examples of the conductive material may include a carbon-containing material (such as a natural graphite, an artificial graphite, carbon black, acetylene black, ketjen black, carbon fiber, etc.); a metal powder (such as copper powder, nickel powder, aluminum powder, silver powder, and/or the like); a metal-containing material (such as a metal fiber and/or the like); a conductive polymer (such as a polyphenylene conductor and/or the like); and a conductive material including a mixture thereof may be utilized.

For the positive electrode according to an exemplary embodiment of the present invention having the above described configuration, the positive electrode active material layer may be manufactured by mixing the positive electrode active material including the small particle size positive electrode active material and the large particle size positive electrode active material, the binder, and the conductive material in a solvent to form a slurry, coating the slurry to a current collector to form a coating layer, and drying the coating layer to form the positive electrode active material layer. Next, for example, the rolling process utilizing a roll-press method may be applied to the positive electrode active material layer to manufacture the positive electrode.

This positive electrode manufacturing process may be performed by utilizing a method that is well known in the art, and the method is not particularly limited such that the detailed description thereof is not provided again.

On the other hand, in the present description, a thickness of the positive electrode active material layer may be in a range of 0 to 200 μm before performing the rolling process, and for example, 50 to 150 μm. However embodiments of the present disclosure are not particularly limited.

Also, in the present description, the active mass density of the positive electrode may be 4.2 g/cc or more. For example, the active mass density of the positive electrode may be in the range of 4.2 g/cc to 5 g/cc or 4.2 g/cc to 4.8 g/cc.

In the exemplary embodiment of the present description, by mixing the small particle size active material formed with the first coating layer on the surface thereof and having the average particle diameter of 2 μm to 4 μm and the large particle size active material formed with the second coating layer on the surface thereof and having the average particle diameter of 17 μm to 21 μm, the positive electrode active material having the real bi-modal size distribution may be manufactured, thereby obtaining the positive electrode having the high active mass density.

In another aspect, the present invention provides the rechargeable lithium battery including the positive electrode, a negative electrode including a negative active material, and an electrolyte.

The positive electrode included in the rechargeable lithium battery according to embodiments of the present invention is the same as that described above. Therefore, detailed description is not provided again.

Next, the negative electrode includes the current collector and the negative active material layer formed on the current collector. The negative active material layer includes the negative active material.

The negative active material includes a material that can perform reversible intercalation and deintercalation of lithium ions, a lithium metal, an alloy of the lithium metal, a material for doping or dedoping lithium, and/or a transition metal oxide.

The material that can perform reversible intercalation and deintercalation of lithium ions may include a carbon-based material. Any generally-utilized carbon-based negative active material may be utilized in a lithium ion secondary battery, and as a non-limiting representative example, crystalline carbon, amorphous carbon, or a combination thereof may be utilized. An example of the crystalline carbon may be graphite (such as amorphous (e.g., irregularly shaped), plate-shaped, flake-shaped, circular-shaped, and/or fiber-like natural and/or artificial graphite), and an example of the amorphous carbon may be a soft carbon (a low temperature calcined carbon), a hard carbon, a mesophase pitch-based carbide, calcined coke, or a combination thereof.

The alloy of the lithium metal may be a metal alloy of lithium and one selected from Na, K, Rb, Cs, Fr, Be, Mg, Ca, Sr, Si, Sb, Pb, In, Zn, Ba, Ra, Ge, Al, and Sn.

As the material for doping and dedoping the lithium, Si, $SiO_x$ ($0<x<2$), a Si-Q alloy (Q is an alkali metal, an alkali earth metal, a group 13 element, a group 14 element, a transition metal, a rare earth element, or a combination thereof, and is not Si), a Si—C composite, or a Si-based compound of a combination thereof; Sn, $SnO_2$, Sn—R (R is an alkali metal, an alkali earth metal, a group 13 element, a group 14 element, a transition metal, a rare earth element, or a combination thereof, and is not Sn), or a Sn-based compound of a combination thereof; or a combination thereof, may be utilized, and at least one of them and $SiO_2$ may be mixed. As the element Q and R, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof may be utilized.

As the transition metal oxide, a vanadium oxide, a lithium vanadium oxide, and/or a titanium oxide may be utilized.

In the negative active material layer, the content of the negative active material may be 95 wt % to 99 wt % of (based on) the entire weight of the negative active material layer.

The negative active material layer may also include a binder, and may further selectively include a conductive material. In the negative active material layer, the content of the binder may be 1 wt % to 5 wt % of the entire weight of the negative active material layer. Also, when the conductive material is further included, the negative active material may be included at 90 wt % to 98 wt %, the binder may be included at 1 to 5 wt %, and the conductive material may be included at 1 to 5 wt %.

The binder serves to bind negative electrode active material particles to each other well, and bind a negative electrode active material to a current collector well. The binder may be a non-aqueous binder, an aqueous binder, or combinations thereof.

The non-aqueous binder may be polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, polyamide-imide, polyimide, or a combination thereof.

The aqueous binder may be a rubber-based binder and/or a polymer resin binder. The rubber-based binder may be selected from styrene-butadiene rubber, acrylic federated (e.g., copolymerized) styrene-butadiene rubber (SBR), acrylonitrile-butadiene rubber, acrylic rubber, butyl rubber, fluorine rubber, and combinations thereof. The polymer resin binder may be selected from polytetrafluoroethylene, polyethylene, polypropylene, an ethylene propylene copolymer, polyethylene oxide, polyvinylpyrrolidone, polyepichlorohydrin, polyphosphazene, polyacrylonitrile, polystyrene, an ethylene-propylene-diene copolymer, polyvinyl pyridine, chlorosulfonated polyethylene, latex, polyester resin, acrylic resin, phenol resin, epoxy resin, polyvinyl alcohol, and combinations thereof.

When the negative electrode binder utilizes the aqueous binder, a cellulose-based compound may be further included as a thickener (e.g., for adjusting the viscosity). The cellulous-based compound may be at least one mixture of carboxymethyl cellulose, hydroxypropylmethyl cellulose, methyl cellulose, or alkali metal salts thereof. The alkali metal may be Na, K, or Li. The usage content of the viscosifier agent may be 0.1 to 3 wt % to 100 wt % of the binder.

The conductive material is utilized to give conductivity to the electrodes, and any suitable material that does not cause a chemical change and corresponds to (e.g., is) an electronically conductive material may be utilized in batteries. As an example, a conductive material containing a carbon-based material (such as natural graphite, artificial graphite, carbon black, acetylene black, ketjen black, or carbon fiber); a metal-based material (such as a metal powder or a metal fiber of copper, nickel, aluminum, silver, or the like); a conductive polymer (such as a polyphenylene derivative); or a mixture thereof, may be utilized.

The current collector of the negative electrode may be at least one selected from a copper foil, a nickel foil, a stainless steel foil, a titanium foil, a nickel foam, a copper foam, a polymer substrate coated with a conductive metal, or a combination thereof.

The electrolyte includes the non-aqueous organic solvent and the lithium salt.

The non-aqueous organic solvent serves as a medium through which ions involved in an electrochemical reaction of a battery can move.

Examples of the non-aqueous organic solvent may include carbonate-based solvents, ester-based solvents, ether-based solvents, ketone-based solvents, alcohol-based solvents, and aprotic solvents.

Examples of the carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and the like. Examples of the ether-based solvent may include dibutyl ether, tetraglyme, diglyme, dimethoxy ethane, 2-methyl tetrahydrofuran, tetrahydrofuran, and the like. Examples of the ketone-based solvent may include cyclohexanone and the like. In addition, examples of the alcohol-based solvent may include ethyl alcohol, isopropyl alcohol, and the like. Examples of the aprotic solvent may include nitriles (such as R—CN (R is a C2-C20 straight, branched, or cyclic hydrocarbon group which may include a double bonded aromatic ring or an ether bond)), amides (such as dimethylformamide), dioxanes (such as 1,3-dioxolane), sulfolanes, and the like.

The non-aqueous organic solvents may be utilized alone or in a combination of two or more. When they are utilized in a combination of two or more, the mixing ratio thereof may be appropriately controlled according to the desired battery performance, which may be widely understood by those skilled in the art.

In addition, when the carbonate-based solvent is utilized, a mixture of a cyclic carbonate and a chained (e.g., linear) carbonate thereof may be utilized. In this case, the cyclic carbonate and the chained carbonate may be mixed at a volume ratio of 1:1 to 1:9, so that the performance of the electrolyte can be favorably exhibited.

The organic solvent according to an embodiment of the present invention may further contain (include) an aromatic hydrocarbon-based organic solvent in addition to the carbonate-based solvent. Here, the carbonate-based solvent and the aromatic hydrocarbon-based organic solvent may be mixed at a volume ratio of 1:1 to 30:1.

As the aromatic hydrocarbon-based organic solvent, an aromatic hydrocarbon-based compound of Chemical Formula 1 below may be utilized.

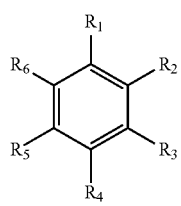

Chemical Formula 1

In Chemical Formula 1, $R_1$ to $R_6$ are the same as or different from each other, and are each independently selected from hydrogen, a halogen group, a C1-C10 alkyl group, a haloalkyl group, and a combination thereof.

The aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodo benzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further contain (include) vinylene carbonate and/or an ethylene carbonate-based compound of Chemical Formula 2 below in order to improve the battery lifespan.

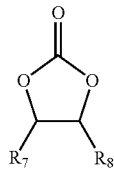

Chemical Formula 2

In Chemical Formula 2, $R_7$ and $R_8$ are the same as or different from each other, and are each independently selected from hydrogen, a halogen group, a cyano group (CN), a nitro group ($NO_2$), and a C1-C5 fluoroalkyl group, and at least one of $R_7$ and $R_8$ is a halogen group, a cyano group (CN), a nitro group ($NO_2$), or a C1-C5 fluoroalkyl group. However, $R_7$ and $R_8$ are not both hydrogen.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When these lifespan improving additives are further utilized, the usage amounts thereof may be appropriately controlled.

The lithium salt is dissolved in the organic solvent to act as a lithium ion supply source in the battery, thereby enabling a basic operation of a lithium secondary battery and promoting the movement of lithium ions between a positive electrode and a negative electrode. Representative examples of the lithium salt include, as a supporting electrolyte salt, at least one selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2, C_yF_{2y+1}SO_2)$ (where x and y are natural numbers), LiCl, LiI, and $LiB(C_2O_4)_2$ (lithium bis(oxalato) borate:LiBOB). The concentration of the lithium salt may be 0.1 to 2.0 M. If the concentration of the lithium salt falls within the above range, the electrolyte has appropriate electrical conductivity and viscosity, so that the electrolyte performance can be excellent and the lithium ions can be effectively moved.

A separator may exist between the positive electrode and the negative electrode depending on the kind of the rechargeable lithium battery. As the separator, polyethylene, polypropylene, polyvinylidene fluoride, or a multilayer of two or more layers thereof may be utilized, or a mixed multilayer such as a polyethylene/polypropylene two layer separator, a polyethylene/polypropylene/polyethylene three layer separator, and/or a polypropylene/polyethylene/polypropylene three layer separator may also be utilized.

FIG. 1 schematically shows an exploded perspective view of a rechargeable lithium battery according to embodiments of the present invention. FIG. 1 shows a prismatic rechargeable lithium battery as one example, however the present invention is not limited thereto, and various suitable shapes of batteries such as a cylindrical shape and/or a pouch shape may be applied.

Referring to FIG. 1, the rechargeable lithium battery 100 includes an electrode assembly 40 wound with a separator 30 interposed between a positive electrode 10 and a negative electrode 20, and a case 50 incorporated with the electrode assembly 40. The positive electrode 10, the negative electrode 20, and the separator 30 may be impregnated with an electrolyte solution.

Hereafter, the present invention will be described in more detail through exemplary embodiments.

Exemplary Embodiment 1

Manufacturing a Positive Electrode

An active material (e.g., a first active material) having an average particle diameter D50 of 19 μm and coated with a coating layer having an average thickness of about 50 nm on the surface thereof is utilized as the large particle size active material. The coating layer includes Al at 0.6 mol % and Ti at 0.15 mol %. An active material (e.g., a second active material) having an average particle diameter D50 of 3 μm and coated with a coating layer having an average thickness of about 50 nm on the surface thereof is utilized as the small particle size active material. The coating layer includes Al at 0.6 mol % and Ti at 0.15 mol %. A mixed positive electrode active material at 97 wt % (including 85 wt % of the large particle size active material and 15 wt % of the small particle size active material), an acetylene black conductive material at 1.5 wt %, and a polyvinylidene fluoride binder at 1.5 wt % are mixed in an N-methyl pyrrolidone solvent to manufacture the positive electrode active material slurry.

The positive electrode active material slurry is coated on an Al foil with a 10 μm thickness and dried at 120° C., and is rolled (pressed) to manufacture the positive electrode.

(2) Manufacturing a Negative Electrode

An artificial graphite negative active material at 90 wt % and a polyvinylidene fluoride binder at 10 wt % are mixed in an N-methyl pyrrolidone solvent to manufacture a negative active material slurry.

The negative active material slurry is coated on a Cu foil with a 10 μm thickness and dried at 100° C., and is rolled (pressed) to manufacture the negative electrode.

(3) Manufacturing a Rechargeable Lithium Battery

A 1.0 M $LiPF_6$ solution is dissolved in a mixed non-aqueous organic solvent of ethylene carbonate and methyl ethyl carbonate (3:7 volume ratio) to manufacture the electrolyte.

A half-cell of a coin type (CR2032) is manufactured by utilizing the positive electrode and the negative electrode manufactured in (1) and (2) and the electrolyte.

Exemplary Embodiment 2 and Comparative Examples 1 to 11

The positive electrode, the negative electrode, and the rechargeable lithium battery are manufactured by substantially the same method as Exemplary Embodiment 1, except for controlling (varying) the average particle diameter, the content of the small particle size active material, the content of the large particle size active material, and the formation or absence of the coating layer on the surfaces of the small particle size active material and the large particle size active material, as indicated in Table 1.

TABLE 1

| Distinction | Large particle size active material | | Small particle size active material | | Coating |
| --- | --- | --- | --- | --- | --- |
| | D50 (μm) | Content (wt %) | D50 (μm) | Content (wt %) | |
| Exemplary Embodiment 1 | 19 | 85 | 3 | 15 | Formation |
| Exemplary Embodiment 2 | 19 | 80 | 3 | 20 | Formation |
| Comparative Example 1 | 19 | 85 | 3 | 15 | Absence |
| Comparative Example 2 | 19 | 90 | 6 | 10 | Absence |
| Comparative Example 3 | 19 | 90 | 6 | 10 | Formation |
| Comparative Example 4 | 19 | 85 | 1 | 15 | Absence |
| Comparative Example 5 | 19 | 85 | 1 | 15 | Formation |
| Comparative Example 6 | 19 | 85 | 5 | 15 | Absence |
| Comparative Example 7 | 19 | 85 | 5 | 15 | Formation |
| Comparative Example 8 | 16 | 85 | 3 | 15 | Absence |
| Comparative Example 9 | 16 | 85 | 3 | 15 | Formation |
| Comparative Example 10 | 23 | 85 | 3 | 15 | Absence |
| Comparative Example 11 | 23 | 85 | 3 | 15 | Formation |

Exemplary Embodiment 3

The positive electrode active material slurry is manufactured by substantially the same method as Exemplary Embodiment 1.

The positive electrode active material slurry is coated on the Al foil with a 10 μm thickness and dried at 120° C., and the rolling process is performed to obtain the active mass density of 4.25 g/cc to manufacture the positive electrode.

Next, the negative electrode and the rechargeable lithium battery are manufactured by substantially the same method as Exemplary Embodiment 1.

Comparative Example 12

The mixed positive electrode active material at 97 wt % (in which the large particle size active material (average particle diameter D50: 19 μm) at 90 wt % and the small particle size active material (average particle diameter D50: 6 μm) at 10 wt % are mixed), the acetylene black conductive material at 1.5 wt %, and the polyvinylidene fluoride binder at 1.5 wt % are mixed in the N-methylpyrrolidone solvent to manufacture the positive electrode active material slurry.

The positive electrode active material slurry is coated on the Al foil with a 10 μm thickness and is dried at 120° C., and the rolling process is performed to obtain the active mass density of 4.25 g/cc, thereby manufacturing the positive electrode.

Next, the negative electrode and the rechargeable lithium battery are manufactured by substantially the same method as Exemplary Embodiment 1.

Experimental Example 1—Measuring Active Mass Density

The active mass density is measured for the positive electrode according to Exemplary Embodiments 1 and 2 and Comparative Examples 1 to 11. In more detail, the active mass density is measured by a method of obtaining the weight of the active material per coated unit area after rolling the positive electrode plate coated on both sides with the active material, punching the coated positive electrode plate utilizing a plate puncher of a 36π size, and dividing the weight by the coating thickness of the active material excluding the thickness of the base material, and a result thereof is shown in Table 2 and FIG. 2.

Experimental Example 2—Measuring High Temperature Cycle-Life Characteristic

Figure 3:
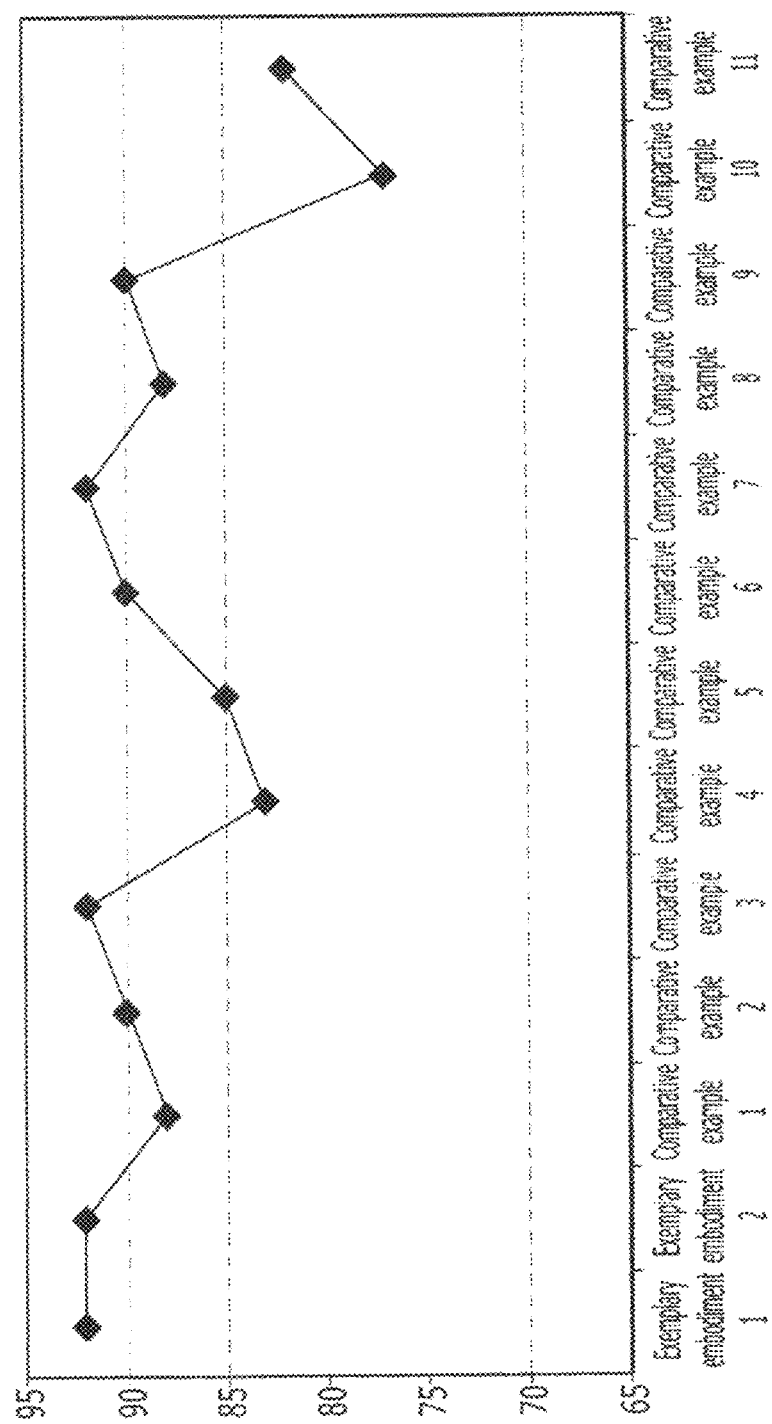
FIG. 3 is a graph showing the high temperature cycle-life of a rechargeable lithium battery according to Exemplary Embodiments 1 and 2 and Comparative Examples 1 to 11.

A result of measuring the high temperature characteristic of each rechargeable lithium battery manufactured by utilizing the positive electrode manufactured according to Exemplary Embodiments 1 and 2 and Comparative Examples 1 to 11 is shown in Table 2 and FIG. 3.

First, in a chemical conversion act, the rechargeable lithium battery is charged/discharged at a current density of 0.1 C at 45° C., the charging is performed with a constant current until the voltage reaches 4.6 V (vs. Li), and the discharging is performed with the constant current of 0.1 C until the voltage reaches 3 V (vs. Li).

Next, cycle charging of each of the rechargeable lithium battery with the constant current until the voltage reaches 4.6 V (vs. Li) with the current density of 1 C at 45° C. and discharging it with the constant current of 1 C until the voltage reaches 3 V (vs. Li) is repeated 50 times.

TABLE 2

| Distinction | Active mass density (g/cc) | High temperature cycle-life (%) |
| --- | --- | --- |
| Exemplary Embodiment 1 | 4.33 | 92 |
| Exemplary Embodiment 2 | 4.29 | 92 |
| Comparative Example 1 | 4.2 | 88 |
| Comparative Example 2 | 3.95 | 90 |
| Comparative Example 3 | 4.13 | 92 |
| Comparative Example 4 | 4.13 | 83 |
| Comparative Example 5 | 4.2 | 85 |
| Comparative Example 6 | 3.97 | 90 |
| Comparative Example 7 | 4.11 | 92 |
| Comparative Example 8 | 4.07 | 88 |
| Comparative Example 9 | 4.15 | 90 |
| Comparative Example 10 | 4.22 | 77 |
| Comparative Example 11 | 4.26 | 82 |

Figure 2:
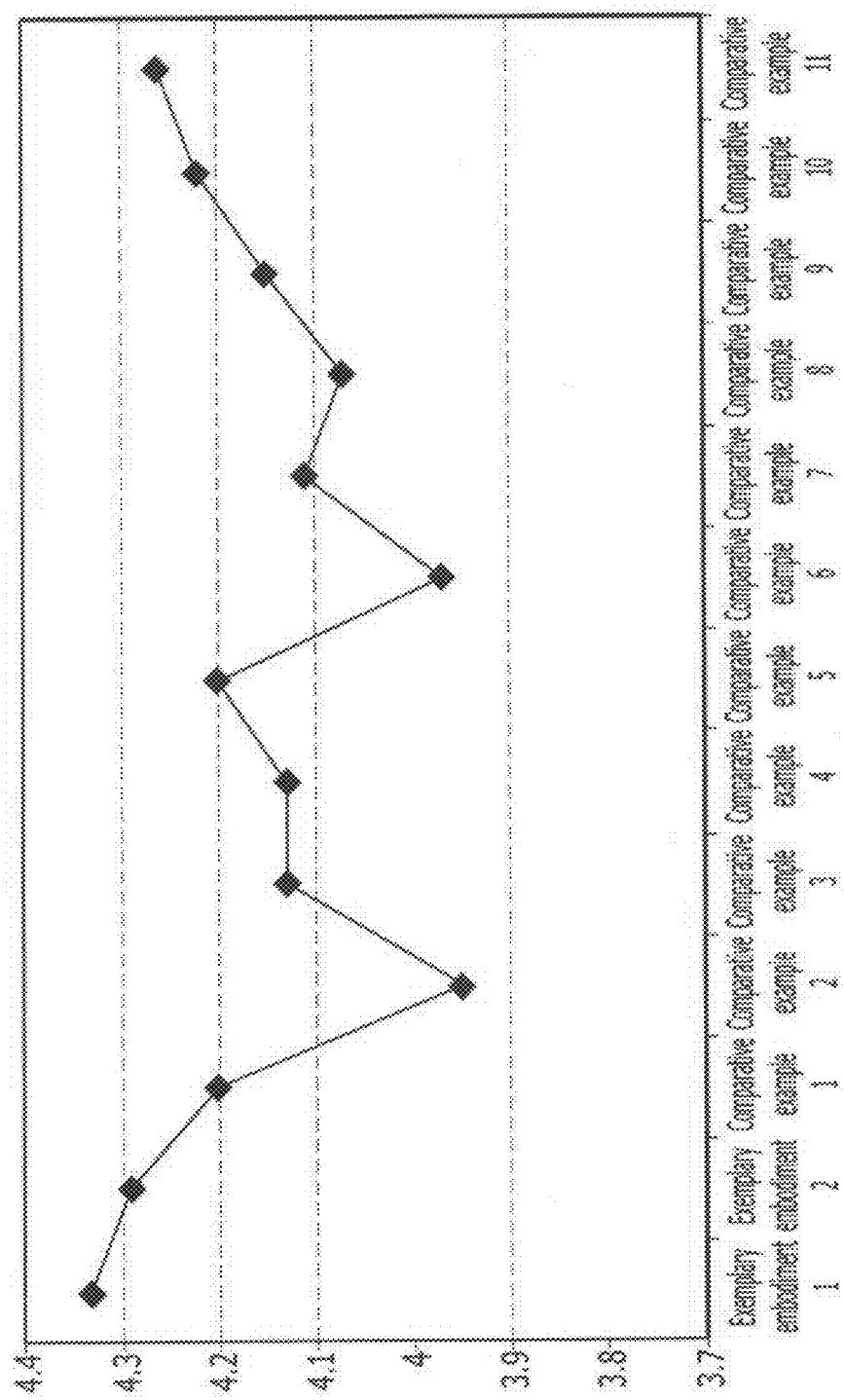
FIG. 2 is a graph showing the active mass density of a positive electrode for a rechargeable lithium battery according to Exemplary Embodiments 1 and 2 and Comparative Examples 1 to 11.

Referring to Table 2, FIG. 2, and FIG. 3, it can be confirmed that the cycle-life characteristic is excellent at the high temperature while having the high active mass density in the case of the positive electrode and the rechargeable battery according to an exemplary embodiment (e.g., Exemplary Embodiment 1 and/or 2) of the present invention.

In contrast, in the positive electrode according to Comparative Examples 5, 10, and 11, it can be confirmed that the active mass density is high. However, when the positive electrode is applied to the rechargeable battery, the high temperature cycle-life characteristic is remarkably deteriorated.

Also, in the case of the rechargeable lithium battery according to Comparative Examples 2, 3, 6, 7, and 9, it can be confirmed that the high temperature cycle-life characteristic is good. However, it is difficult to obtain a battery having the high energy density because the active mass density of the positive electrode is low. Further, in the positive electrode and the rechargeable lithium battery according to Comparative Examples 4 and 8, the active mass density is low and the high temperature cycle-life characteristic is also low.

Experimental Example 3: Bi-Modal Distribution Confirmation

Figure 4:
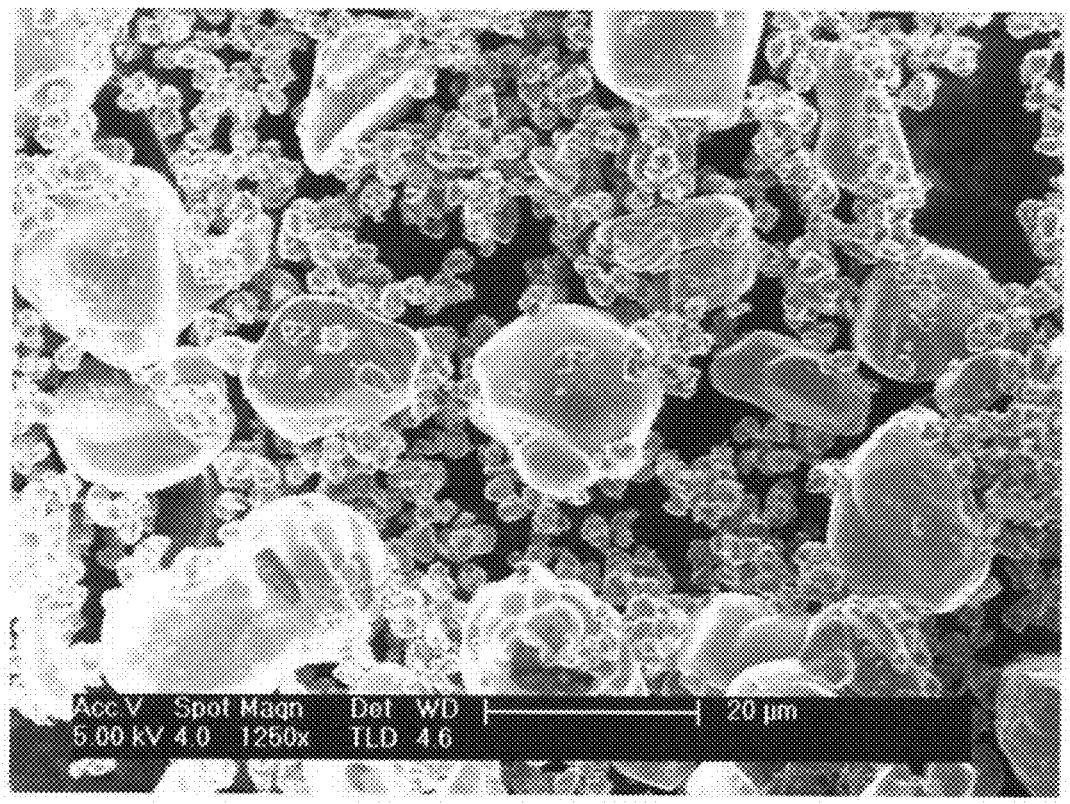
FIG. 4 is a Scanning Electron Microscope (SEM) photo of a mixed positive electrode active material manufactured according to Exemplary Embodiment 2.
Figure 5:
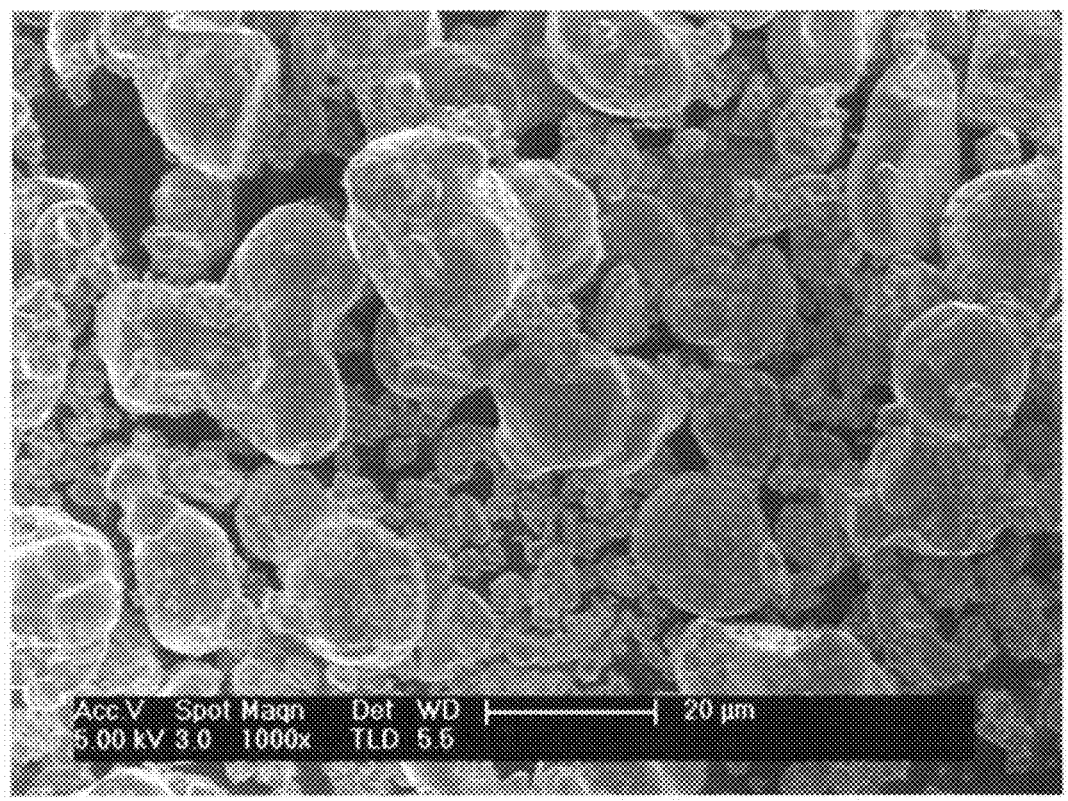
FIG. 5 is an SEM photo of a mixed positive electrode active material manufactured according to Comparative Example 2.

For the mixed positive electrode active material manufactured according to Exemplary Embodiment 2 and the mixed positive electrode active material manufactured according to Comparative Example 2, SEM photos are shown respectively in FIG. 4 and FIG. 5.

Figure 6:
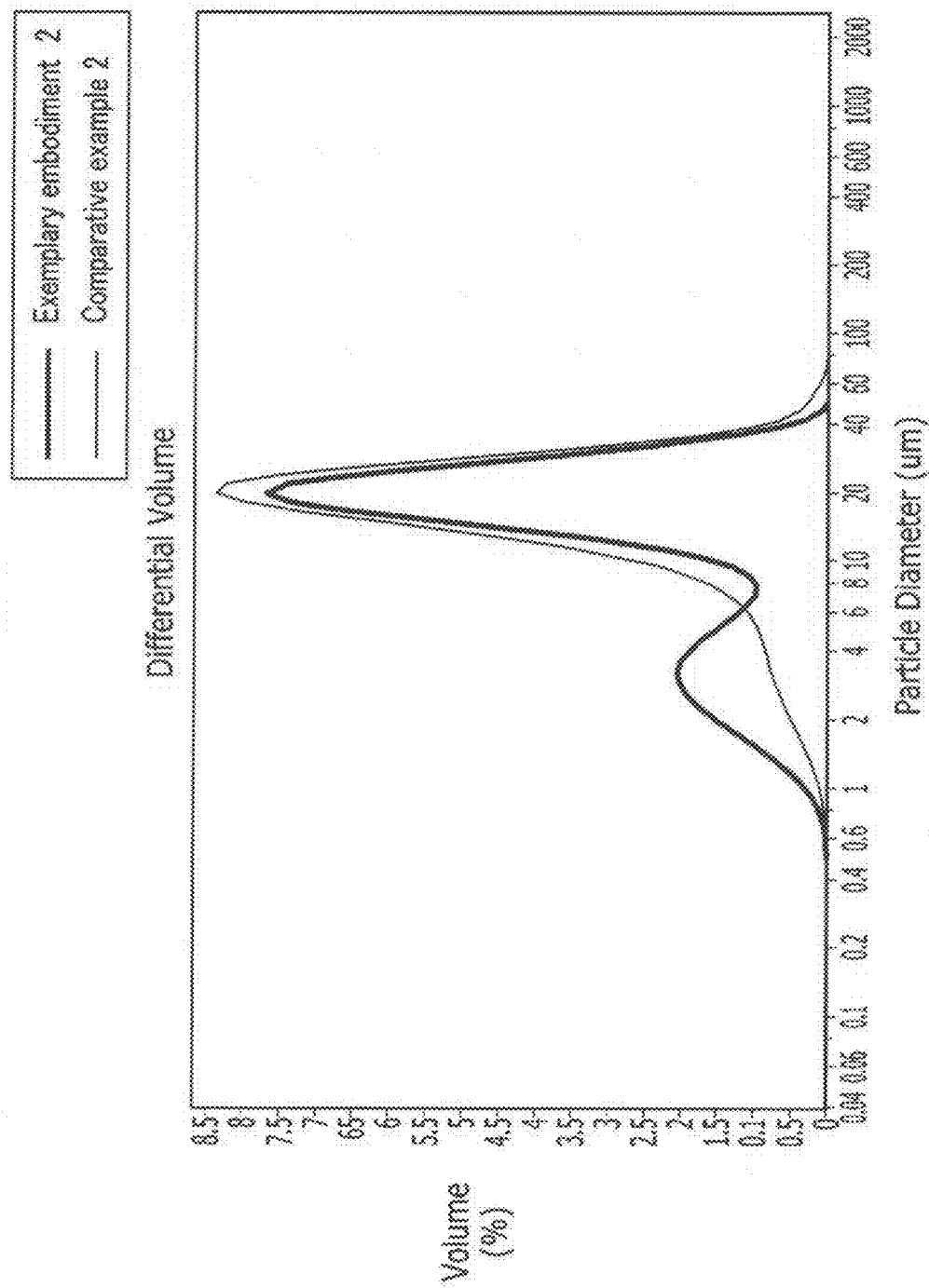
FIG. 6 is a graph showing the grain size distribution for a mixed positive electrode active material manufactured according to Exemplary Embodiment 2 and a mixed positive electrode active material manufactured according to Comparative Example 2.

Also, the result of measuring the grain-sized distribution (the particle size distribution) for the positive electrode active materials is shown in FIG. 6.

Referring to FIG. 4 (with magnification of ×1250 times), in the case of the mixed positive electrode active material manufactured according to Exemplary Embodiment 2, the small particle size active material is uniformly mixed between the large particle size active material. In contrast, referring to FIG. 5 (with magnification of ×1000 times), in the case of the mixed positive electrode active material manufactured according to Comparative Example 2, it can be confirmed that the large particle size active material is mainly observed compared with the small particle size active material.

Also, referring to FIG. 6, in the case of the mixed positive electrode active material according to Exemplary Embodiment 2, because the peak for the large particle size active material and the peak for the small particle size active material both appear, it can be confirmed that the active material having two (e.g., bi-modal) particle size distributions uniformly exists. However only one peak appears in the case of the mixed positive electrode active material according to Comparative Example 2.

Accordingly, in the case of the exemplary embodiment according to the present invention, through FIG. 4 to FIG. 6, it can be confirmed that the positive electrode active material layer does have the bi-modal particle size distribution.

That is, like (as) the positive electrode for the rechargeable lithium battery according to an exemplary embodiment of the present invention, when the small particle size active material with the average particle diameter of 2 µm to 4 µm and the large particle size active material with the average particle diameter of 17 µm to 21 µm are mixed together, it can be confirmed that the appropriate bi-modal size distribution appears.

Figure 7:
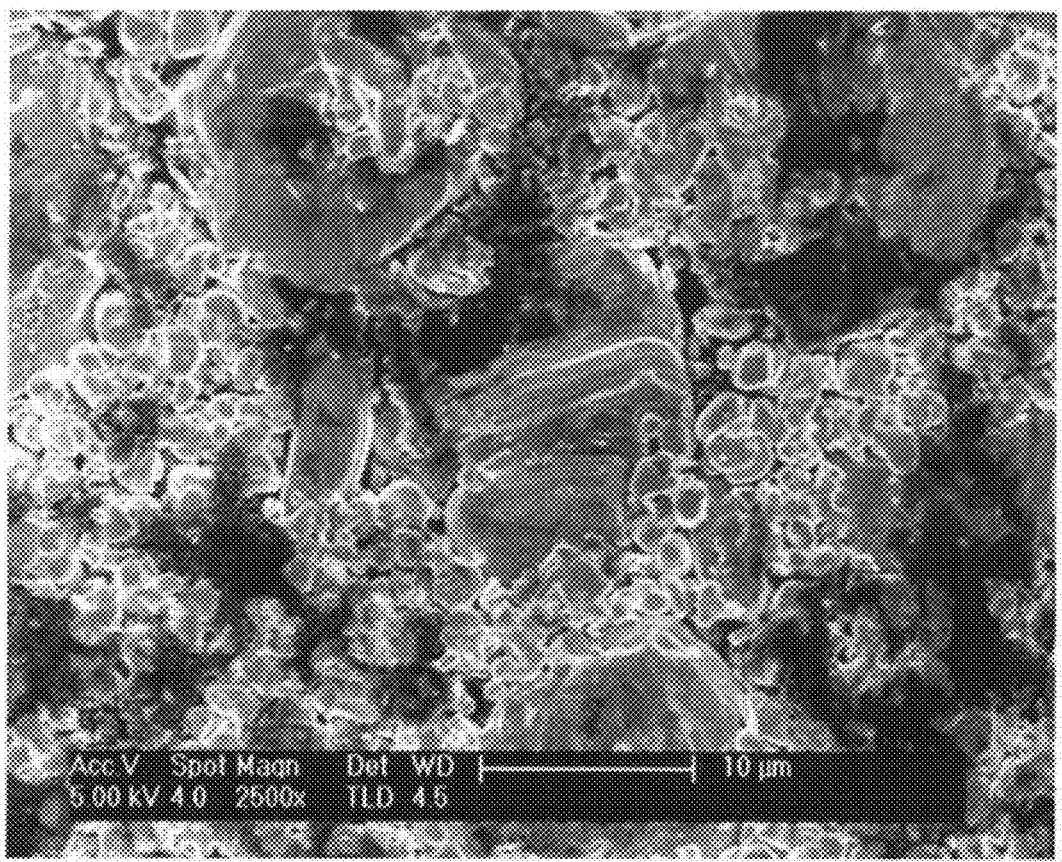
FIG. 7 and FIG. 8 are surface SEM photos of a positive electrode manufactured according to Exemplary Embodiment 2 after performing a rolling process.
Figure 8:
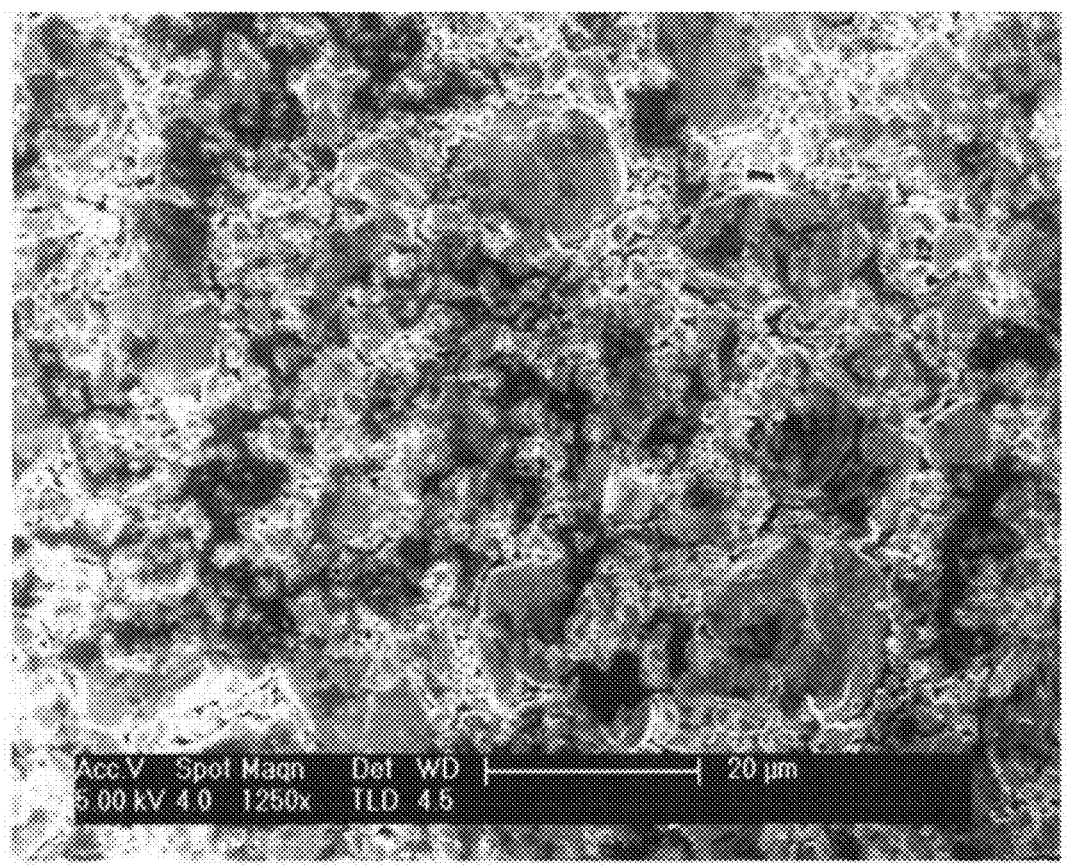
Figure 9:
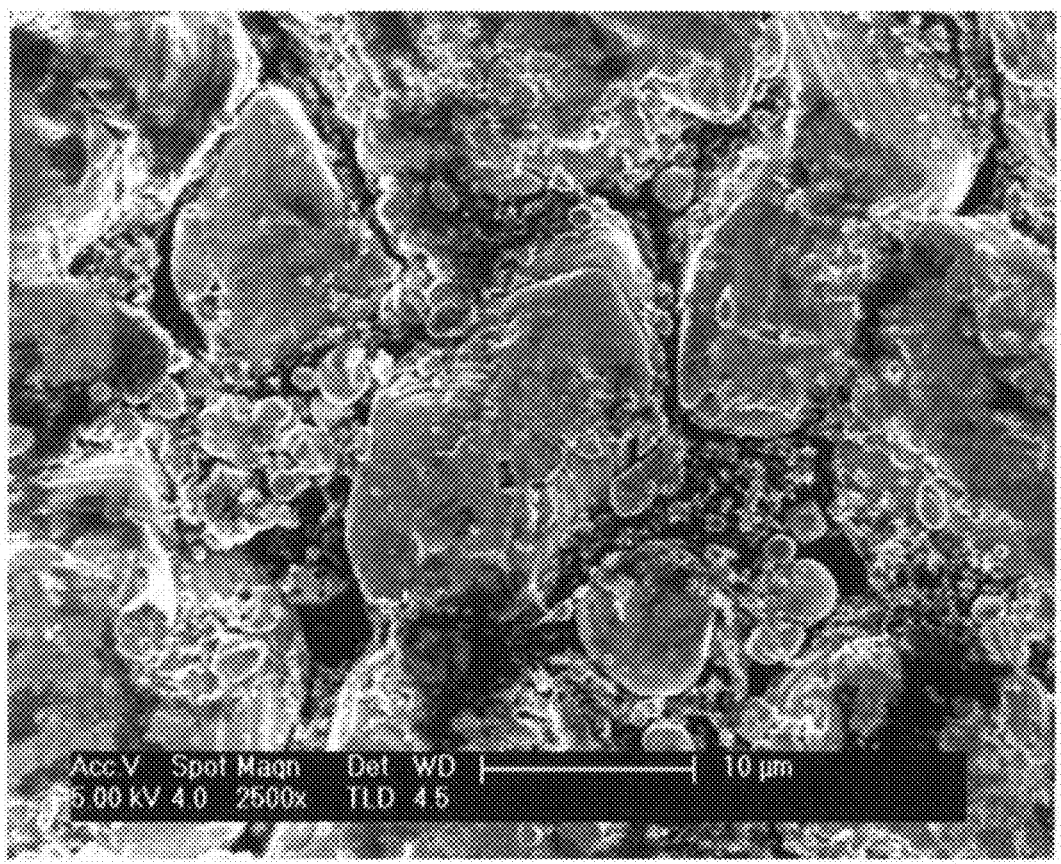
FIG. 9 and FIG. 10 are surface SEM photos of a positive electrode manufactured according to Comparative Example 2 after performing a rolling process.
Figure 10:
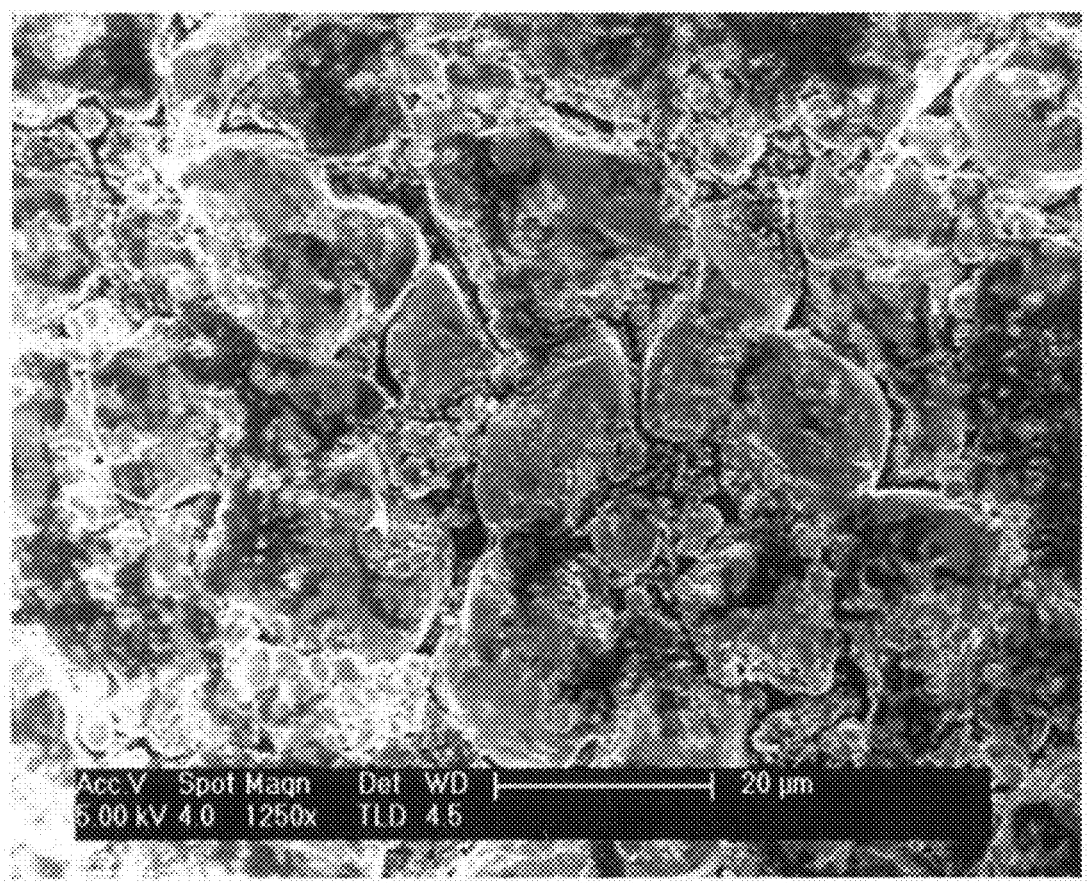

Experimental Example 4: Measuring Positive Electrode Surface after a Rolling Process For the positive electrode manufactured according to Exemplary Embodiment 2 and the positive electrode manufactured according to Comparative Example 2, the SEM photos for the surface after the rolling process are shown in FIG. 7 to FIG. 10, respectively. FIG. 7 and FIG. 9 are the photos measured by a scale×2500, and FIG. 8 and FIG. 10 are the photos measured by the scale×1250.

In the case of FIG. 7 and FIG. 8 (as the photos of the positive electrode surface according to Exemplary Embodiment 2), it can be confirmed that the volume of the air gap is low and the small particle size active material stably encloses the large particle size active material.

In contrast, in the case of FIG. 9 and FIG. 10 (as the photos of the positive electrode surface according to Comparative Example 2), a noticeable black line is observed, indicating that the volume of the air gap between the active materials is greater, and the small particle size active material does not sufficiently enclose the large particle size active material.

Figure 11:
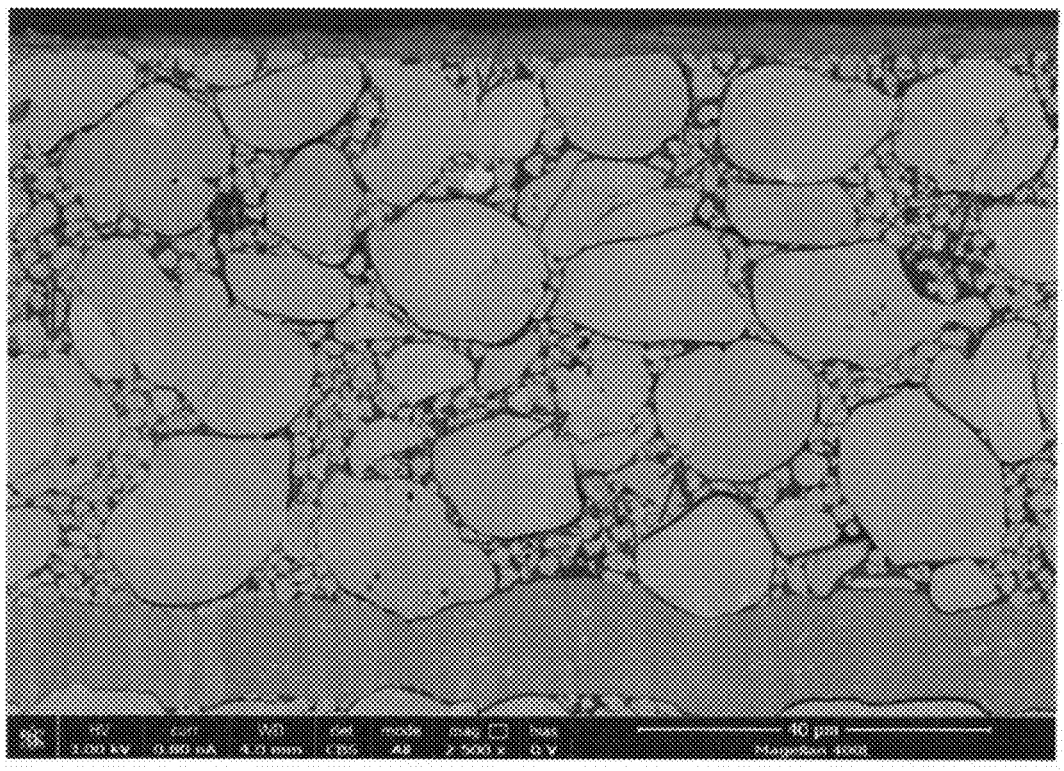
FIG. 11 is an SEM photo of the cross-section of a positive electrode manufactured according to Exemplary Embodiment 3.
Figure 12:
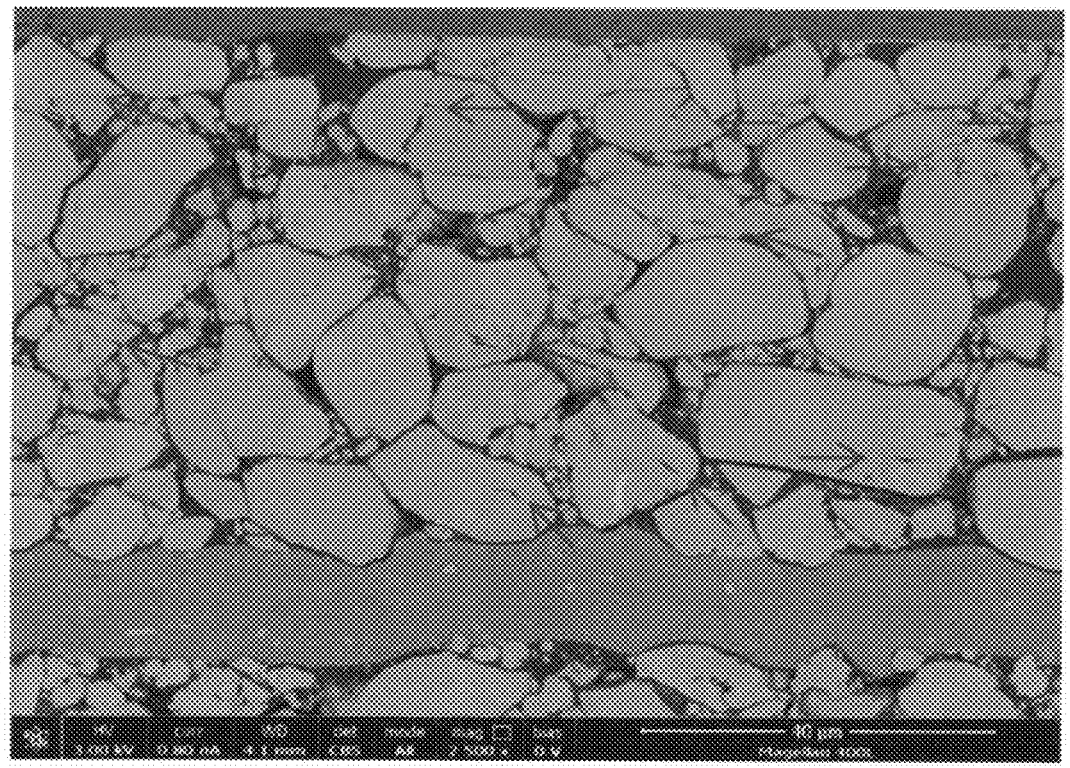
FIG. 12 is an SEM photo of the cross-section of a positive electrode manufactured according to Comparative Example 12.

Experimental Example 5: Measuring Positive Electrode Cross-Section after a Rolling Process For the positive electrode manufactured according to Exemplary Embodiment 3 and the positive electrode manufactured according to Comparative Example 12, the cross-sectional SEM photos of the broken plates (e.g., the positive electrode) are shown in FIG. 11 and FIG. 12, respectively. Parts indicated by an arrow in the cross-sectional photos represent parts where the large particle size active material is broken.

Comparing FIGS. 11 and 12, when manufacturing the positive electrode with the same high active mass density, in the case of the positive electrode according to Exemplary Embodiment 3, compared with the positive electrode according to Comparative Example 12, it can be confirmed that broken part of the (e.g., the number of broken) large particle size active material is substantially less (e.g., about half of that of the positive electrode according to Comparative Example 12).

Accordingly, in the case of the positive electrode according to an exemplary embodiment of the present invention, even if the rolling process is performed to have the high active mass density, the cracks of the active material is significantly reduced (e.g., hardly occurs) such that it may be predicted that the problem such as the deterioration of the characteristic of the battery may not be generated.

Experimental Example 6: Electrode Plate Fracture Test

The electrode plate fracture test is performed by utilizing the positive electrode manufactured according to Exemplary Embodiment 2 and Comparative Example 2. The fracture test is performed by a method in which an upper surface of the plate is referred to as surface A, a lower surface of the plate is referred to as surface B, and the electrode plate is folded in half such as the surface A is positioned as the inner surface (e.g., the surface A of the two half electrode plates contact each other), and then is unfolded.

Figure 13:
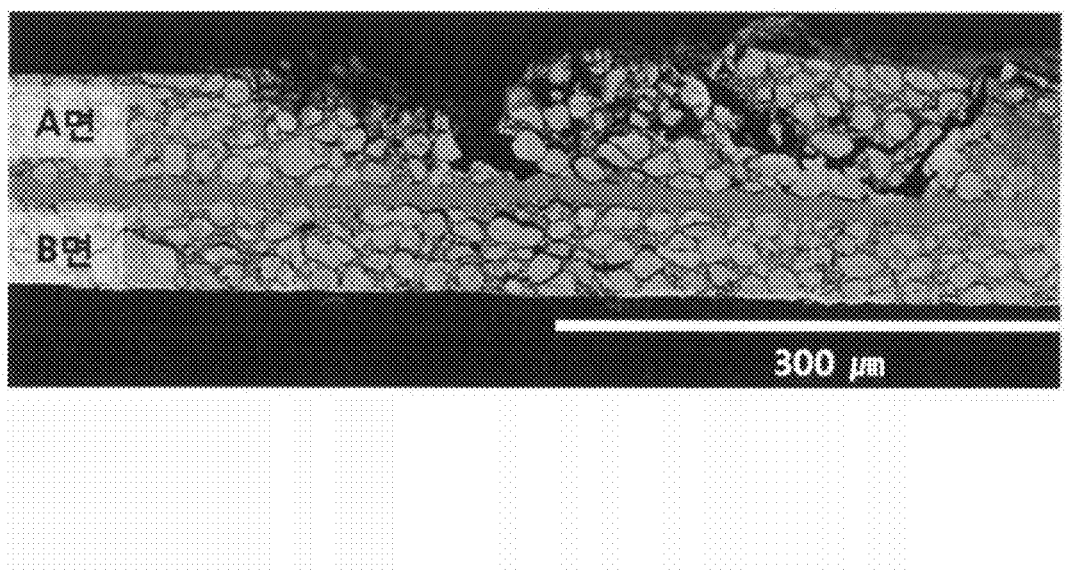
FIG. 13 and FIG. 15 are images showing a plate fracture test result for a positive electrode manufactured according to Exemplary Embodiment 2.
Figure 14:
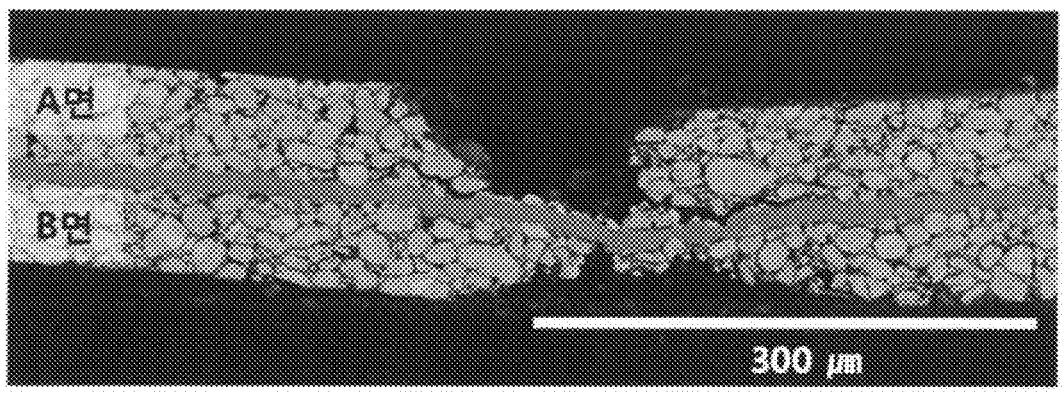
FIG. 14 and FIG. 16 are images showing a plate fracture test result for a positive electrode manufactured according to Comparative Example 2.
Figure 15:
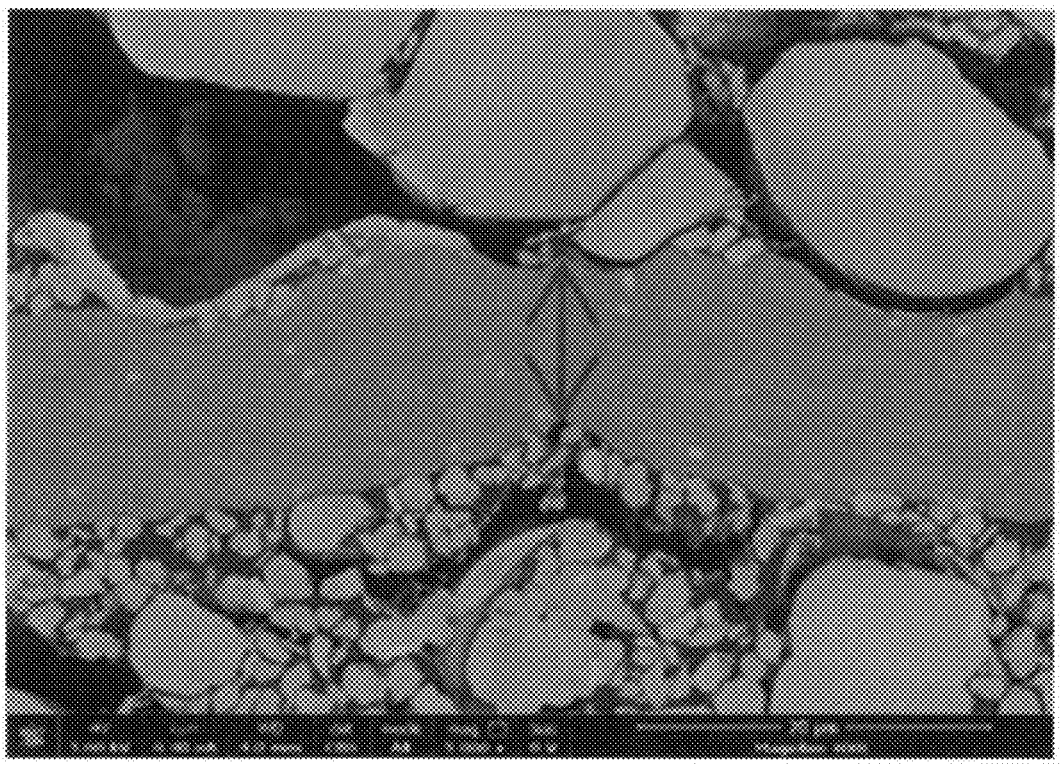
Figure 16:
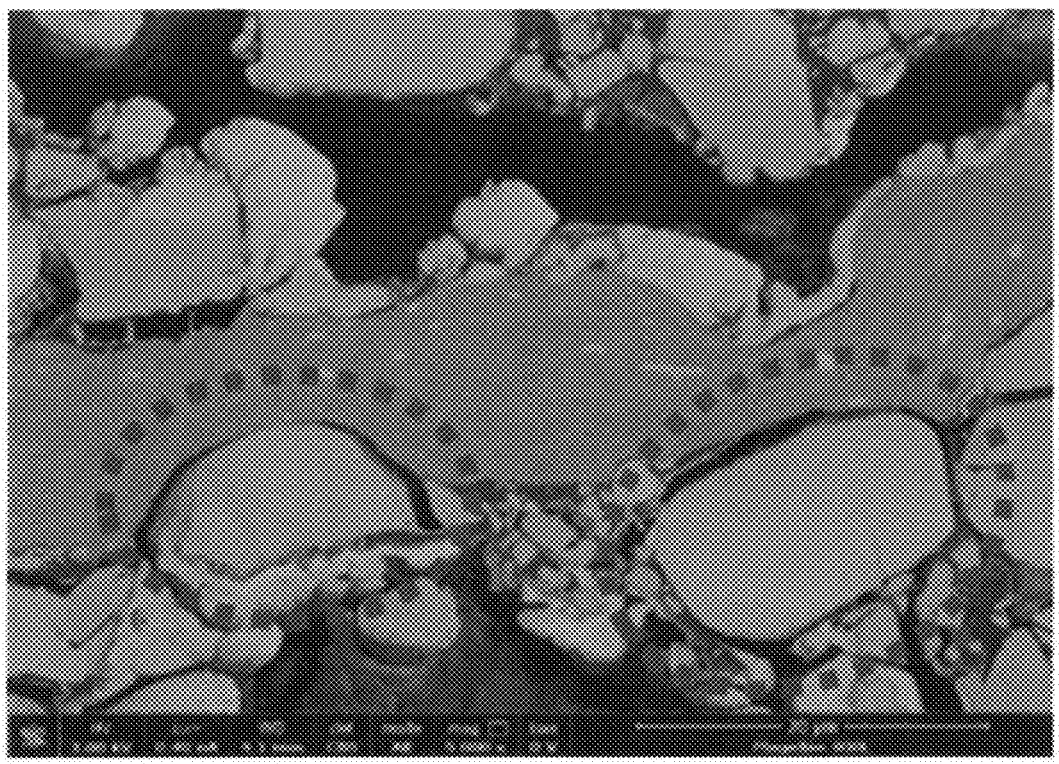

Next, cross-sectional SEM photos of the folded part are respectively shown in FIG. 13 and FIG. 14, and the cross-sectional SEM photos of the aluminum base part are respectively shown in FIG. 15 and FIG. 16.

Referring to FIG. 13, in the case of the positive electrode according to Exemplary Embodiment 2, it can be confirmed that there is virtually no separation of the active material layer of the outer surface (the B side) after the fracture test, and only a part of the active material of the inner surface (the A side) is separated, and the electrode plate is not broken.

In contrast, referring to FIG. 14, in the case of the positive electrode according to Comparative Example 2, it can be confirmed that the active material of the outer surface (the B side) and the inner surface (the A side) of the fold part is separated and almost does not remain, and the base material is broken.

Also, referring to FIG. 15, in the aluminum base material of the positive electrode according to Exemplary Embodiment 2, the center part receiving the force is only a little thinner (than its original thickness) and there is no large deformation. However, it can be confirmed that the active material is deeply encrusted in the aluminum base material of the positive electrode according to Comparative Example 2 such that the thickness of the base material is significantly thinner (e.g., thinner than half of the original thickness). Accordingly, in the case of manufacturing a spiral-wound type of battery by utilizing the positive electrode according to Comparative Example 2, it can be predicted that the plate disconnection may be easily generated even through a weak force because of the thinner thickness of the base material, thereby the failure rate may be significantly increased.

Accordingly, the positive electrode according to an exemplary embodiment of the present invention has excellent flexibility such that it can be confirmed that it is suitable (e.g., very suitable) for manufacturing the positive electrode having the high active mass density and that the cycle-life characteristic is also excellent after the manufacturing.

Experimental Example 7: Low Temperature Discharge Estimation

Figure 17:
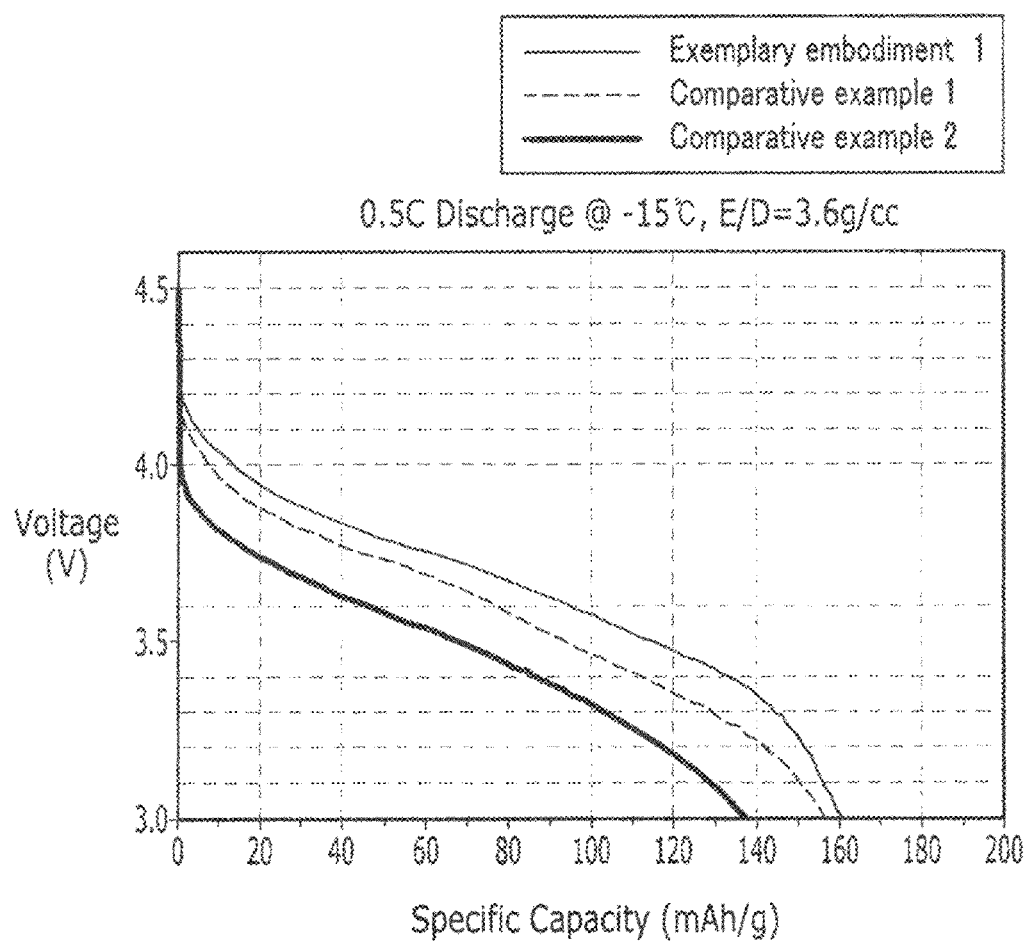
FIG. 17 is a graph showing the low temperature discharge estimation result for Exemplary Embodiment 1, Comparative Example 1, and Comparative Example 2.

For the rechargeable lithium battery manufactured according to Exemplary Embodiment 1 and Comparative Examples 1 and 2, a low temperature discharge estimation result is shown in FIG. 17.

In the chemical conversion act, the charge/discharge is performed at room temperature with the 0.2 C rate, and in this case, the charge rectification voltage is 4.3 V and the discharge rectification voltage is 3.0 V. After the chemical conversion act, the low temperature discharge estimation is performed by the method in which the charge is performed with the 0.2 C current density, the temperature is changed to −15° C., and the discharge is performed with the 0.2 C current density.

In FIG. 17, when the voltage of 3.5 V is described, in the case of the rechargeable lithium battery according to Comparative Example 2, the battery capacity is only 70 mAh/g, in the case of the rechargeable lithium battery according to Comparative Example 1, the battery capacity is only 90 mAh/g, and in the case of the rechargeable lithium battery according to Exemplary Embodiment 1, it can be confirmed that the battery capacity of 110 mAh/g degree is maintained.

That is, compared with Exemplary Embodiment 1 at the same voltage level, it can be confirmed that the discharge capacity of the rechargeable lithium battery according to Comparative Example 1 and Comparative Example 2 is remarkably decreased.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims, and equivalents thereof.

DESCRIPTION OF SYMBOLS

100: rechargeable lithium battery
10: positive electrode
20: negative electrode
30: separator
40: electrode assembly
50: case

What is claimed is:
1. A positive electrode for a rechargeable lithium battery, comprising:
a current collector; and
a positive electrode active material layer on at least one surface of the current collector, wherein the positive electrode active material layer comprises:
- a small particle size active material having an average particle diameter D50 of 2 μm to 4 μm and a first coating layer at a surface thereof,
- a large particle size active material having an average particle diameter D50 of 17 μm to 21 μm and a second coating layer at a surface thereof, and
- an active mass density of the positive electrode for the rechargeable lithium battery is 4.2 g/cc or more, and wherein at least one of the first coating layer and the second coating layer comprises Al at 0.01 mol % to 1 mol % and Ti at 0.01 mol % to 1 mol % based on a total molar amount of the respective small particle size active material or the large particle size active material.

2. The positive electrode of claim 1, wherein at least one of the first coating layer and the second coating layer comprises at least one material selected from the group consisting of Al, Ti, Mg, Co, K, Na, Ca, Si, V, Sn, Ge, Ga, B, As, and Zr.

3. The positive electrode of claim 1, wherein a content ratio of the large particle size active material to the small particle size active material is in a range of 75:25 to 95:5.

4. The positive electrode of claim 1, wherein the small particle size active material and the large particle size active material are at least one selected from the group consisting of a lithium-nickel-containing oxide, a lithium-cobalt-containing oxide, a lithium-iron-phosphate-containing oxide, a lithium-manganese-containing oxide, a lithium-titanium-containing oxide, a lithium-nickel-manganese-containing oxide, a lithium-nickel-cobalt-manganese-containing oxide, a lithium-nickel-cobalt-aluminum-containing oxide, and combinations thereof.

5. The positive electrode of claim 1, wherein a thickness of the positive electrode active material layer is greater than 0 to 200 μm or less.

6. A rechargeable lithium battery comprising:
the positive electrode of claim 1;
a negative electrode; and
an electrolyte.

7. The rechargeable lithium battery of claim 6, wherein at least one of the first coating layer and the second coating layer comprises at least one material selected from the group consisting of Al, Ti, Mg, Co, K, Na, Ca, Si, V, Sn, Ge, Ga, B, As, and Zr.

8. The rechargeable lithium battery of claim 6, wherein a content ratio of the large particle size active material to the small particle size active material is in a range of 75:25 to 95:5.

9. The rechargeable lithium battery of claim 6, wherein the small particle size active material and the large particle size active material are at least one selected from the group consisting of a lithium-nickel-containing oxide, a lithium-cobalt-containing oxide, a lithium-iron-phosphate-containing oxide, a lithium-manganese-containing oxide, a lithium-titanium-containing oxide, a lithium-nickel-manganese-containing oxide, a lithium-nickel-cobalt-manganese-containing oxide, a lithium-nickel-cobalt-aluminum-containing oxide, and combinations thereof.

10. The rechargeable lithium battery of claim 6, wherein a thickness of the positive electrode active material layer is greater than 0 to 200 μm or less.

* * * * *